United States Patent [19]

Murata et al.

[11] 4,327,186
[45] Apr. 27, 1982

[54] SINTERED SILICON CARBIDE-TITANIUM DIBORIDE MIXTURES AND ARTICLES THEREOF

[75] Inventors: Yorihiro Murata, Tonawanda; Gary W. Weber, Amherst, both of N.Y.

[73] Assignee: Kennecott Corporation, Stamford, Conn.

[21] Appl. No.: 161,726

[22] Filed: Jun. 23, 1980

[51] Int. Cl.$^3$ .................. C04B 35/56; C04B 35/58
[52] U.S. Cl. ........................................ 501/92; 264/65
[58] Field of Search ............................ 106/44; 264/65

[56] References Cited

U.S. PATENT DOCUMENTS

| | | | |
|---|---|---|---|
| 2,108,794 | 2/1938 | Boyer et al. | 75/136 |
| 2,406,275 | 8/1946 | Wejnarth | 201/76 |
| 3,775,137 | 11/1973 | Clougherty et al. | 106/44 |
| 3,775,138 | 11/1973 | Clougherty et al. | 106/44 |
| 3,808,012 | 4/1974 | Bailey et al. | 106/44 |
| 3,852,099 | 12/1974 | Prochazka | 106/44 |
| 3,853,566 | 12/1974 | Prochazka | 264/65 |
| 3,859,399 | 7/1975 | Bailey et al. | 264/29 |
| 3,954,483 | 5/1976 | Prochazka | 423/345 |
| 3,960,577 | 6/1976 | Prochazka | 106/44 |
| 4,067,743 | 1/1978 | Arabei et al. | 106/44 |
| 4,080,415 | 3/1978 | Coppola et al. | 106/44 |
| 4,124,667 | 11/1978 | Coppola et al. | 106/44 |
| 4,135,938 | 1/1979 | Murata et al. | 106/44 |
| 4,174,971 | 11/1977 | Schrewelius | 106/44 |
| 4,179,299 | 12/1979 | Coppola et al. | 106/44 |

FOREIGN PATENT DOCUMENTS

| | | |
|---|---|---|
| 901520 | 7/1962 | United Kingdom . |
| 1226437 | 3/1971 | United Kingdom . |
| 1298808 | 12/1972 | United Kingdom . |
| 1496857 | 1/1978 | United Kingdom . |

Primary Examiner—O. R. Vertiz
Assistant Examiner—Mark Bell
Attorney, Agent, or Firm—William H. Holt; Raymond W. Green; Donald C. Studley

[57] ABSTRACT

Sintered articles made from binary compositions of silicon carbide and titanium diboride are described. The articles may be prepared by initially mixing finely-divided silicon carbide, carbon or a carbon source material, a densification or sintering aid, and finely-divided titanium diboride, forming the mixture into a desired shape and subsequently heating at temperatures sufficiently high to form a sintered ceramic article of silicon carbide and titanium diboride. When the present sintered ceramic articles contain high amounts of titanium diboride, generally between about 65 and about 95 percent, and more preferably, between about 80 and about 95 percent, by weight, they are quite electrically conductive, generally having less than 0.2 ohm-cm electrical resistivity, and are useful as electrical ignitors. Such articles are also extremely resistant to corrosion by molten aluminum and aluminum alloys; thus, they are aptly suited to use as electrodes in aluminum refining processes. When the present sintered ceramic articles contain high amounts of silicon carbide, generally between about 50 and about 95 percent by weight, they are characterized by high densities and high strengths, typically having MOR above 50,000 psi, and an extraordinary resistance to thermal shock. Such articles are particularly useful in the fabrication of diesel engine precombustion chambers and as honeycomb structures, such as those utilized in automobile emission control units.

11 Claims, No Drawings

SINTERED SILICON CARBIDE-TITANIUM DIBORIDE MIXTURES AND ARTICLES THEREOF

TECHNICAL FIELD

This invention relates to sintered silicon carbide-titanium diboride mixtures and articles thereof, which can particularly be used for electrodes in aluminum refining or precombustion chambers and honeycomb structures, such as those utilized in automobile emission control units.

BACKGROUND ART

Silicon carbide, a crystalline compound of silicon and carbon, has long been known for its hardness, its strength and its excellent resistance to oxidation and corrosion. Silicon carbide has a low coefficient of expansion, good heat transfer properties and maintains high strength at elevated temperatures. In recent years, the art of producing high density silicon carbide bodies from silicon carbide powders has been developed. Methods include reaction bonding, chemical vapor deposition, hot pressing and pressureless sintering (initially forming the article and subsequently sintering under substantially pressureless conditions). Examples of these methods are described in U.S. Pat. Nos. 3,852,099; 3,853,566; 3,954,483; 3,960,577; 4,080,415; 4,124,667; and 4,179,299. The high density, sintered silicon carbide bodies produced are excellent engineering materials and find utility in the fabrication of components for turbines, heat exchange units, pumps and other equipment or tools that are exposed to severe wear and/or operation under high temperature conditions. The present invention relates methods of producing compositions of sintered silicon carbide and titanium diboride and to articles made of such binary ceramic material.

DISCLOSURE OF INVENTION

The present sintered articles are made from binary compositions of silicon carbide and titanium diboride and are prepared by initially mixing finely-divided silicon carbide, carbon or a carbon source material, a densification or sintering aid, and finely-divided titanium diboride, forming the mixture into a desired shape and subsequently heating at temperatures sufficiently high to form a sintered ceramic article of silicon carbide and titanium diboride.

The silicon carbide component may suitably be selected from alpha or beta phase silicon carbide. Mixtures of alpha and beta phase material may be utilized. The silicon carbide starting material of the present invention does not require separation or purification of phases to obtain a sinterable material. Minor amounts of amorphous silicon carbide may be included without deleterious effect. The silicon carbide component is utilized in finely-divided form. A suitable finely-divided material may be produced by grinding, ball milling or jet milling larger particles of silicon carbide and subsequently classifying or separating a component suited to use in the present invention. Preferably, the silicon carbide starting material has a maximum particle size of about 5 microns and an average particle size of about 0.10 to about 2.50 microns. It is difficult to obtain accurate particle size distribution for silicon carbide powders having a size less than about 1 micron in size, and, therefore, surface area may be considered relevant in determining suitable material. Accordingly, the preferred silicon carbide particles for use in the present powders have a surface area of from about 1 to about 100 m$^2$/g. Within this range, it is more preferred that the surface area of particles range between about 2 and about 50 m$^2$/g, and, within that range, a range from about 2 to about 20 m$^2$/g has been found eminently useful.

The carbon or carbon source material is one that will supply from about 0.5 to about 6.0 percent by weight of the silicon carbide component in excess or combinable carbon to the mixture to be sintered. The carbon component facilitates the subsequent sintering operation and aids in reducing the amounts of oxides that might otherwise remain in the finished sintered product. In a more preferred range, the combinable carbon is present in amounts between about 2.0 and about 5.0 percent by weight of silicon carbide. Liquid organic materials or solutions or suspensions of organic materials may be used as the carbon source. Particularly useful are furfuryl alcohol and resin materials that also perform as a temporary binder during the initial cold pressing operation which leave a carbon residue in the formed body upon heating. A resin material particularly adopted to use in the present invention is a liquid thermosetting phenolformaldehyde resin typified by that sold by Varcum Chemical Division of Reichhold Chemicals, Inc. under the designation of Varcum B-178. Generally, such carbonizable organic materials provide from about 30 to about 50 percent of their original weight in combinable carbon. If desired, both a carbon source, such as petroleum coke, finely divided graphite or carbon black, and a carbonizable binder may be included in the mixture. Most preferred and useful in the present invention are thermosetting resin materials which function as both binding materials and as a carbon source.

The densification, or sintering aids useful in the present invention are those found in the prior art, for example, those described in U.S. Pat. Nos. 4,080,415; 4,124,667; and 4,179,299. Boron or boron-containing compounds are preferred densification aids. Examples of useful boron-containing aids are boron carbide, boron nitride, boron oxide, aluminum diboride, metallic boron and silicon hexaboride. Densification aids are generally effective in the range of from about 0.2 to about 3.0 percent by weight, for example, the weight of boron as compared to the weight of the silicon carbide component. A particularly useful densification aid in the present composition is B$_4$C. The sintering aid may be added, in part or in whole, by carrying out the sintering process in an atmosphere of a sintering aid, for example, boron.

The suitable titanium diboride starting component of submicron size and satisfactory purity may be obtained by treating commercially available titanium diboride or may be produced by reacting high purity titanium dioxide, B$_2$O$_3$ and carbon at elevated temperatures and milling the titanium diboride product to obtain a finely-divided product. The titanium diboride component is preferably utilized in a particle size range similar to that size range described above for the silicon carbide component.

The silicon carbide and the titanium diboride components may contain minor amounts of impurities, such as iron, calcium, magnesium and aluminum, without deleterious effect on the product.

The components are thoroughly mixed to obtain an intimate mixture and formed, suitably by being cold molded or pressed, at pressures between about 6,000 and 20,000 psi, and more preferably, between about 12,000 and 18,000 psi, to obtain a green body. The green body is subsequently furnaced at temperatures between about 1900° C. and 2200° C., under substantially pressureless conditions, to sinter the silicon carbide component and obtain a sintered composite ceramic article comprised of silicon carbide and titanium diboride. The present composite sintered ceramic articles typically have densities ranging between about 85 and about 98 percent of the theoretical density of silicon carbide/titanium diboride composites (based on 3.21 g/cc and 4.50 g/cc for SiC and TiB$_2$, respectively).

In addition to being hard and dense, the composite ceramic articles of the present invention possess many other desirable characteristics, being tough, wear-resistant, abrasion-resistant and resistant to most acids and alkalis. The thermal shock resistance of the articles increases with increasing titanium diboride content, articles of high titanium content having particularly outstanding thermal shock resistance.

The present composite ceramic articles containing high amounts of titanium diboride, generally between about 65 and about 95 percent, and, more preferably, between about 80 and about 95 percent, by weight, are quite electrically conductive, generally having less than 0.2 ohm-cm resistivity, and are useful as electrical ignitors. Such articles are also extremely resistant to corrosion by molten aluminum and aluminum alloys; thus, they are aptly suited to use as current conducting elements used in contact with molten aluminum and alloys thereof, as electrodes in aluminum refining processes. In addition, such articles are also useful as parts of pumps used for pumping molten aluminum or alloys thereof, for example, pistons, cylinders and impellers.

The present sintered ceramic articles containing high amounts of silicon carbide, generally between about 50 and about 95 percent, and more preferably, between about 80 and about 95 percent, by weight, are characterized by high densities and high strengths, typically having a modulus of rupture (MOR) of about 50,000 psi. Such articles, surprisingly, have extraordinary resistance to thermal shock, and are particularly useful in the fabrication of diesel engine precombustion chambers, or honeycomb structures, such as those utilized in automobile emission control units, which require the combination of high strength and high resistance to thermal shock. Such honeycomb structures typically have various cell configurations with cell widths varying between about 0.075 and about 5.0 cm, wall thicknesses between about 0.0025 and about 0.25 cm, and lengths between about 2.5 and about 60 cm. Generally, such structures are formed by extrusion. The present compositions are aptly suited to such forming processes and yield a honeycomb product having high mechanical strength and excellent thermal shock resistance.

BEST MODE FOR CARRYING OUT INVENTION

The invention will now be described in greater detail partly with reference to the following examples, which are intended to illustrate, and not to limit the scope of the invention. In the following examples, all parts are parts by weight and all temperatures are in degrees Centigrade.

EXAMPLE I 95 parts of submicron silicon carbide, having an average particle size of about 0.45 microns, was mixed with 5 parts of finely-divided titanium diboride, 0.5 parts of boron carbide, having a size less than 35 microns, and 4.0 parts of Varcum B-178 liquid thermosetting phenol-formaldehyde resin. The mixture was ball-milled with acetone using tungsten carbide balls for two hours in a plastic jar. The mixture was then allowed to dry at room temperature in air and was subsequently screened through an 80 micron silk screen.

The mixture was then cold pressed into a round disc, 3.8 cm in diameter and 0.6 cm high, using a metal mold at a pressure of 15,000 psi. The disc was removed from the mold and sintered under substantially pressureless conditions in an argon atmosphere at a temperature of 2150° C. for a period of one hour.

The product, sintered silicon carbide and titanium diboride, was found to have a bulk density of 3.157 g/cc and a relative density of 97.0 percent. This relative density is computed by the formulas:

$$\text{Theoretical Density} = 1 \div \left( \frac{w_1}{d_1} + \frac{w_2}{d_2} \right)$$

where
$W_1$ = weight fraction of SiC;
$d_1$ = theoretical density of SiC (3.21 g/cc);
$W_2$ = weight fraction of TiB$_2$ (= 1 − $W_1$); and
$d_2$ = theoretical density of TiB$_2$ (4.50 g/cc);

$$\text{and Relative Density} = \frac{\text{Observed Bulk Density}}{\text{Theoretical Density}} \times 100\%.$$

For this Example I, $$1 \div \left( \frac{.95}{3.21} + \frac{.05}{4.50} \right) = 3.256;$$

3.157 ÷ 3.256 × 100% = 97.0%. The product, as determined by microscopy, was found to have a porosity of 0.3 percent. The electrical resistivity, as determined using a four probe method at room temperature, was found to be 294.1 ohm-cm. The average grain size of the titanium diboride component was found to be 6.2 microns and of the silicon carbide 9.0 microns. The modulus of rupture (MOR), using a four point method at room temperature, was found to be 46,000 pounds per square inch (expressed for convenience as 46.0 kpsi).

Examples II through XI were carried out in a similar manner, varying the proportions of the silicon carbide and titanium diboride components. The results are set out in Table A below, in which calculations were made in the same manner as those described above for Example I.

EXAMPLE XII

A mixture containing 80 parts silicon carbide and 20 parts titanium diboride was compounded as in Example I. The mixture was injection molded into the form of a precombustion chamber for a diesel engine and sintered at 2150° for one hour. The sintered product was then heated uniformly using a gas burner to a temperature of about 900° and quenched in cold water. After quenching, visual inspection revealed no cracking or chipping. Similar tests were conducted using chambers fabricated solely of sintered silicon carbide. The sintered silicon carbide chambers developed large cracks and a plurality of chips.

EXAMPLE XIII

A mixture containing 80 parts of silicon carbide and 20 parts titanium diboride is compounded as in Example I and extruded to form a green body in the form of a honeycomb. The honeycomb body has square cells about 0.5 cm in width; the cell walls are about 0.025 cm thick, and the cell is about 15 cm in length. Such structures are eminently useful in the fabrication of automobile emission control units. The honeycomb green body is initially freeze dried at a temperature of less than 10° and subsequently vacuum dried under a vacuum (absolute pressure $10^{-1}$ to $10^{-3}$ mmHg) for about six hours to prevent cracking or distortion of the body during the drying step. The green body is then sintered under substantially pressureless conditions at 2100° for one hour in an argon atmosphere. The sintered product will be found to have a density of about 97% of theoretical, a modulus of rupture of more than 50,000 psi, and, when subjected to the quench test as described in Example XII, shows excellent thermal shock resistance.

As will be appreciated from the foregoing, the present new ceramic articles, comprising small particles of titanium diboride in a matrix of sintered silicon carbide, have a variety of desirable characteristics, depending on the amount of silicon carbide in the initial composition.

TABLE A

| Example No. | Composition (wt%) SiC/TiB$_2$ | Bulk Density (g/cc) | Theoretical Density (g/cc) | Relative Density (%) | Observed Porosity | Electrical Resistivity (ohm-cm) | Grain Size (Microns) TiB$_2$ | SiC | MOR (Kpsi) |
|---|---|---|---|---|---|---|---|---|---|
| I | 95/5 | 3.157 | 3.256 | 97.0 | 0.3 | 294.1 | 6.2 | 9.0 | 46.0 |
| II | 90/10 | 3.185 | 3.304 | 96.4 | 2.1 | 23.9 | 5.6 | 9.0 | 48.7 |
| III | 80/20 | 3.270 | 3.405 | 96.0 | 1.0 | 2.0 | 8.6 | 9.0 | 52.7 |
| IV | 70/30 | 3.345 | 3.512 | 95.2 | 1.3 | 0.14 | 9.0 | 9.6 | 42.1 |
| V | 60/40 | 3.421 | 3.625 | 94.4 | 1.2 | 0.30 | 9.2 | 9.6 | 38.3 |
| VI | 50/50 | 3.473 | 3.747 | 92.7 | 4.7 | 0.20 | 12.0 | 12.0 | 35.2 |
| VII | 40/60 | 3.541 | 3.876 | 91.4 | 7.6 | 0.04 | 9.9 | 12.0 | 26.8 |
| VIII | 30/70 | 3.622 | 4.015 | 90.2 | 18.1 | 0.01 | 10.2 | 16.2 | 23.8 |
| IX | 20/80 | 3.693 | 4.165 | 88.7 | 19.9 | 0.172 | 15.2 | 21.2 | 17.1 |
| X | 10/90 | 3.825 | 4.326 | 88.4 | 43.7 | 0.003 | 30.0 | 37.0 | 14.8 |
| XI | 5/95 | 3.877 | 4.411 | 87.9 | 40.9 | 0.001 | 32.3 | 42.5 | 15.2 |

Articles made from compositions containing lower amounts, less than about 30 percent, and, more particularly, less than about 20 percent, by weight, silicon carbide exhibit excellent thermal shock resistance. Such materials are good electrical conductors, making them useful as home heater-range ignitors. They are also highly resistant to molten aluminum, aluminum alloys and molten silicates, making them useful as industrial electrodes in smelting processes. These compositions also exhibit desirable properties as ceramic armor materials. In contrast, the present ceramic articles may be produced using compositions containing higher amounts, greater than about 60 percent, and, more particularly, greater than about 80 percent, by weight, silicon carbide. Such ceramic materials are hard, dense materials having an extraordinary resistance to thermal shock and are useful as abrasives, in fabrication of tools and other wear-resistant articles, and particularly in processes or operations in which the article undergoes rapid and extreme temperature changes.

While the invention has been described herein with reference to certain examples and preferred embodiments, it is to be understood that various changes and modifications may be made by those skilled in the art without departing from the concept of the invention, the scope of which is to be determined by reference to the following claims.

What is claimed is:

1. A binary composite sintered ceramic article produced under substantially pressureless sintering conditions comprising from about 80 to about 95% by weight of silicon carbide and from about 5 to about 20% by weight of titanium diboride.

2. The sintered ceramic article of claim 1 wherein the particle size of the components is less than 10 microns.

3. The sintered ceramic article of claim 1 wherein the modulus of rupture is greater than 52,000 psi.

4. A binary composite sintered ceramic article produced under substantially pressureless sintering conditions in the shape of a honeycomb, comprising a plurality of open cells, said cells having a width between about 0.075 and about 5.0 cm. and a wall thickness between about 0.0025 and about 0.25 cm., comprising from about 5 to about 95% by weight of silicon carbide and from about 5 to about 95% by weight of titanium diboride.

5. A method of producing a composite ceramic article which comprises the steps of:
   a. mixing from about 5 to about 95 percent by weight of submicron silicon carbide, from about 5 to about 95 percent by weight of finely-divided titanium diboride, from about 0.5 to about 5.0 percent by weight of carbon or a carbon source material, and from about 0.2 to about 3.0 percent by weight of a sintering aid,
   b. forming the mixture into a green body in the shape of the article,
   c. freeze drying and subsequently vacuum drying said green body, and
   d. sintering said green body under substantially pressureless conditions to produce a sintered article comprising silicon carbide and titanium diboride.

6. The method of claim 5 wherein the carbon source material is a phenol-formaldehyde resin.

7. The method of claim 5 wherein the sintering aid is boron carbide.

8. The method of claim 5 wherein the silicon carbide starting material is present in an amount between about 80 to about 95 percent by weight.

9. The method of claim 5 wherein the silicon carbide starting material is present in an amount between about 5 to about 20 percent by weight.

10. The methd of claim 5 wherein the sintering step is carried out at temperatures between about 1900° and 2200° C.

11. The method of claim 10 wherein the sintering step is carried out in an inert atmosphere.

* * * * *